United States Patent
Ishikawa et al.

(10) Patent No.: US 9,043,477 B2
(45) Date of Patent: May 26, 2015

(54) COMMUNICATION SYSTEM, SERVER, TERMINAL, PACKET DATA TRANSFERRING METHOD, AND PROGRAM THEREFOR

(75) Inventors: Yuichi Ishikawa, Minato-ku (JP); Ichiro Yamaguchi, Minato-ku (JP); Takayuki Hama, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 1004 days.

(21) Appl. No.: 12/348,521

(22) Filed: Jan. 5, 2009

(65) Prior Publication Data

US 2009/0177788 A1 Jul. 9, 2009

(30) Foreign Application Priority Data

Jan. 8, 2008 (JP) .................................. 2008-001165

(51) Int. Cl.
*H04L 29/06* (2006.01)
(52) U.S. Cl.
CPC ............... *H04L 69/16* (2013.01); *H04L 63/029* (2013.01); *H04L 69/163* (2013.01)
(58) Field of Classification Search
CPC . H04L 29/12566; H04L 63/029; H04L 67/00; H04L 67/14; H04L 67/141; H04L 69/163
USPC ......................................................... 709/228
See application file for complete search history.

(56) References Cited

U.S. PATENT DOCUMENTS

| | | | |
|---|---|---|---|
| 7,173,928 B2 * | 2/2007 | Xu et al. ........................ | 370/352 |
| 2002/0114322 A1* | 8/2002 | Xu et al. ........................ | 370/352 |
| 2002/0143922 A1* | 10/2002 | Tanimoto ...................... | 709/223 |
| 2006/0047839 A1* | 3/2006 | Tate et al. ..................... | 709/230 |
| 2006/0182100 A1* | 8/2006 | Li et al. .......................... | 370/389 |
| 2006/0224753 A1* | 10/2006 | Hama et al. ................... | 709/230 |
| 2008/0130900 A1* | 6/2008 | Hsieh ............................ | 380/278 |

OTHER PUBLICATIONS

Biswas, Anumita. Enhancing TCP Performance Through the Large Window and SACK options. pp. 1-14. Dec. 1, 2002.*
David A. Maltz, et al., "TCP Splicing for Application Layer Proxy Performance," Journal of High Speed Networks, 1999, pp. 225-240, vol. 8, issue 3.

* cited by examiner

*Primary Examiner* — John MacIlwinen
(74) *Attorney, Agent, or Firm* — Sughrue Mion, PLLC

(57) ABSTRACT

A communication system includes a plurality of terminals and a server that relays packet data transmitted and received between a first terminal and a second terminal among the plurality of terminals. The server includes a connection establishment message processing unit configured to transmit a first SYN ACK message that is a response message to a first SYN message transmitted from the first terminal for establishing a TCP connection upon receiving the first SYN message from the first terminal, and an option information notifying unit configured to transmit a first TCP option information notifying message that includes first TCP option information included in the first SYN message from the first terminal and first communication destination information to indicate the second terminal as a destination of communication. The first terminal recognizes the second terminal as the destination of communication and notifies the second terminal of the first TCP option information included in the first TCP option information notifying message, upon receiving the first TCP option information notifying message from the option information notifying unit.

29 Claims, 10 Drawing Sheets

Fig. 2

| ENTRY NUMBER | CONNECTION ADDRESS INFORMATION | | | | TRANSFER START TIME SEQ# INFORMATION | | | |
|---|---|---|---|---|---|---|---|---|
| | CONNECTION 1 | | CONNECTION 2 | | CONNECTION 1 | | CONNECTION 2 | |
| | TERMINAL SIDE | SERVER SIDE | TERMINAL SIDE | SERVER SIDE | TERMINAL SIDE | SERVER SIDE | TERMINAL SIDE | SERVER SIDE |
| ⋮ | ⋮ | ⋮ | ⋮ | ⋮ | ⋮ | ⋮ | ⋮ | ⋮ |
| 123456 | IP_P:port_P | IP_X3:port_X | IP_Q:port_Q | IP_X7:port_X | a+1 | b+1 | d+1 | c+1 |
| ⋮ | ⋮ | ⋮ | ⋮ | ⋮ | ⋮ | ⋮ | ⋮ | ⋮ |

| TCP CONNECTION WAITING ADDRESS | TCP OPTION |
|---|---|
| IP_X1:Port_X | WS:off |
| IP_X2:Port_X | WS:on 0 |
| IP_X3:Port_X | WS:on 1 |
| IP_X4:Port_X | WS:on 2 |
| ... | ... |
| IP_X7:Port_X | WS:on 5 |
| ... | ... |
| IP_X6:Port_X | WS:on 14 |

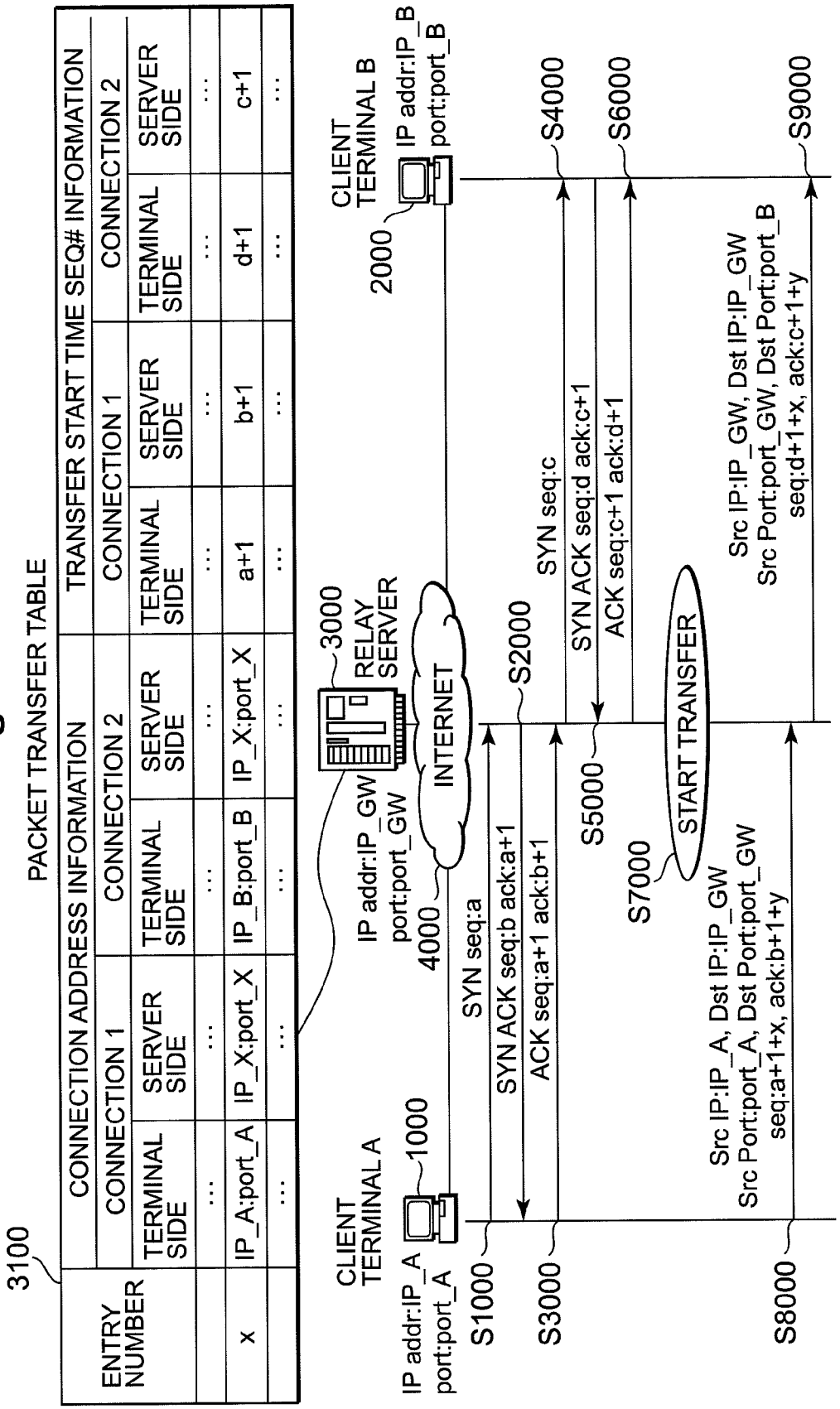

COMMUNICATION SYSTEM, SERVER, TERMINAL, PACKET DATA TRANSFERRING METHOD, AND PROGRAM THEREFOR

This application is based upon and claims the benefit of priority from Japanese patent application No. 2008-1165, filed on Jan. 8, 2008, the disclosure of which is incorporated herein its entirety by reference.

BACKGROUND OF THE INVENTION

1. Technical Field

Aspects of the present invention relate to a communication system, a server, a terminal, a packet transferring method and a program that performs packet transmission and reception, and more particularly relates to a communication system that transmits and receives a packet via the server, and a server, a terminal, a packet transferring method, and a program therefor.

2. Description of the Related Art

In recent years, an increase of activities such as collaboration between companies and departments has led to diversification of business forms. Accordingly, there has been a rapid growth of needs for communication between client terminals connected to different company LANs or department LANs (namely, client terminals connected to different private networks). Considering such a background, there has been recently proposed a method for allowing communication between client terminals connected to different private networks. In a general system, communication between client terminals connected to different private networks is implemented via a relay server installed in a global network. A typical system using the above method includes SoftEther, Packetix VPN, OpenVPN and the like.

In general, a firewall that blocks communication from the global network is installed in the private network. The firewall is set to only allow the communication on a specific TCP connection (generally, TCP communication of a destination port number 80 used in Web browsing communication (namely, HTTP communication) and TCP communication of a destination port number 443 (namely, HTTPS communication)). The private network takes an initiative to establish such a specific TCP connection with the global network. Therefore, according to the general system, first, a client terminal on a private network starts to establish a TCP connection with a relay server. After the completion of the establishment of the TCP connection between the client terminal and the relay server, the client terminal and the relay server are already enabled to perform two-way communication. Thereafter, the client terminal transmits data intended to be delivered to a client terminal which is a communication partner, by using the TCP connection established with the relay server. The relay server transmits the received data by using the TCP connection established between the relay server and the client terminal which is the communication partner.

The aforementioned general system is hereinafter referred to as a firewall traversal communication system According to the firewall traversal communication system, since the relay server terminates the TCP connection when transferring packets between the client terminals, the relay server needs to be subjected to a load for packet retransmission processing and flow control processing.

On the other hand, as a transfer system for data flowing on the TCP connection, there is a TCP splicing system. According to the TCP splicing system, a relay server rewrites the headers of packets and transfers the packets without performing TCP connection termination processing requiring a high processing load (see D. A. Maltz, et al. "TCP splice application layer proxy performance" Journal of High Speed Networks, Volume 8, Issue 3, 1999, p. 225-240; hereinafter "Maltz"), unlike the firewall traversal communication system.

FIG. 10 shows a packet transfer system described in Maltz. In FIG. 10, client terminals A 1000, B 2000 and a relay server 3000 are shown, and the client terminals A 1000 and B 2000 perform communication via the relay server 3000. First, the client terminal A 1000 transmits a SYN message to the relay server 3000 (S1000), and performs 3-Way-Handshake (hereinafter "3WH") (S1000 to S3000) to establish a TCP connection with the relay server 3000. The relay server 3000 registers information of the TCP connection established with the client terminal A 1000, to a packet transfer table 3100 provided therein. Moreover, after completing the establishment of the TCP connection with the client terminal A 1000, the relay server 3000 transmits a SYN message to the client terminal B 2000 (S4000), and performs 3WH (S4000 to S6000) to establish a TCP connection with the client terminal B 2000. After establishing the TCP connection with both client terminals A 1000 and B 2000, the relay server 3000 starts transferring a packet received from one of the TCP connections to the other connection (S7000).

The packet transfer is specifically performed as follows (S8000 to S9000). In the example of FIG. 10, regarding the two TCP connections established between the relay server 3000 and the respective client terminals A 1000 and B 2000, the following information is registered to the packet transfer table 3100:

Client-side IP address and port number;
Relay server-side IP address and port number; and
Which Seq number of packet is lastly transmitted by each of the client terminals and the relay server by using the TCP connections before start of transfer.

The relay server 3000 rewrites the Seq number, the Ack number, the transmission source IP address, the destination IP addresses and the port number of the packet received from one of the TCP connections (and a checksum recalculation accompanying the rewriting) and then transfers the rewritten packet to the other TCP connection. The relay server 3000 does not perform: buffering processing for retransmission packets that are prepared for a case of a packet loss, and are needed if the TCP connection is terminated; packet loss detection processing by analyzing the Seq numbers and Ack numbers of the received packets; packet retransmission processing accompanying a packet loss detection; flow control processing and the like. All of these processings are performed by the client terminals. Therefore, in the packet transfer system described in Maltz, a load applied to the relay server is reduced as compared with the firewall traversal communication system.

The problem of the system of the aforementioned Maltz is that no consideration is given to matching of TCP options between the client terminals that perform communication with each other via the relay server.

In general, TCP includes various options such as a maximum segment size ("MSS"), a window scale ("WS"), and a selective acknowledgment ("SACK"). If a communication is performed without any relay server, at the time of 3WH, both terminals serving as end terminals for the TCP connection matches these options by the SYN message and the SYN ACK message. For example, regarding MSS, the two terminals insert desired MSS values into the SYN message and the SYN ACK message, respectively, then transmit these messages, and use a smaller one of the MSS values, presented by themselves, to perform communication after the establishment of the TCP connection. Moreover, regarding WS, the two terminals each insert, into either the SYN message or the SYN ACK message, a flag ("WS use flag") indicating whether to use WS, and a shift count for a case where the WS is used. Then, when the WS use flag is ON in both terminals, WS is used in the communication after the establishment of the connection, and an advertised window size from the communication partner is calculated using a shift count value notified from the communication partner through either the SYN message or the SYN ACK message. Similarly, regarding SACK, a flag ("SACK use flag") indicating whether to use SACK is inserted to each of the SYN message and the SYN ACK message. Then, when the SACK use flag is ON in both terminals, SACK is used in the communication after the establishment of the connection.

According to the system described in the Maltz, retransmission processing, flow control and the like after 3WH are performed between the client terminals and not between the client terminal and the relay server. Accordingly, the TCP options must be matched between the client terminals.

However, Maltz describes only the point that 3WH is performed between each client terminal and the relay server, and does not refer to the matching of TCP options between the client terminals. And, the above described method for matching the TCP option is not be adapted for the system described in the Maltz. For example, in FIG. 10 even when both the client terminals A 1000 and B 2000 transmit the SYN message and the SYN ACK message in which the WS use flag is ON at the time of 3WH, but if the relay sever 3000 transmits the SYN message and the SYN ACK message in which the WS use flag is OFF, each client terminal performs flow control without using WS in the TCP connection established with the relay server 3000. Accordingly, there is a possibility that communication throughput between the client terminals will be reduced as compared with the case using WS. Further, when the relay server transmits the SYN message and the SYN ACK message in which the WS use flag is ON to each client terminal, and if the WS use flag is ON at one client terminal while the WS use flag is OFF at the other client terminal, one client terminal intends to perform flow control using WS but the other client terminal intends to perform flow control without using WS. As a result, the flow control cannot be correctly performed between the client terminals. The same can be said to SACK. Particularly, WS and SACK largely affect the throughput of TCP connection. For this reason, when these options cannot be matched, the throughput may be largely reduced.

The above problem is true for a case in the firewall traversal communication system, in which two client terminals take initiatives to establish the TCP connection with the relay server.

SUMMARY OF THE INVENTION

An aspect of the present invention is to provide a communication system, and a server, a packet transfer method and a program therefor to match TCP options between two client terminals, when the two client terminals perform communication with each other via the server. Embodiments of the present invention also overcome disadvantages not described above. Indeed, certain embodiments of the present invention may not overcome any of the problems described above.

An aspect of the present invention concerning a communication system includes a plurality of terminals, and a server that relays packet data transmitted and received between a first terminal and a second terminal among the plurality of terminals, wherein the server includes, a connection establishment message processing unit configured to transmit a first SYN ACK message, that is a response message to a first SYN message transmitted from the first terminal for establishing a TCP connection, upon receiving the first SYN message from the first terminal, and an option information notifying unit configured to transmit a first TCP option information notifying message that includes first TCP option information included in the first SYN message from the first terminal and first communication destination information which indicates the second terminal as a destination of communication, wherein the first terminal recognizes the second terminal as the destination of communication and notifies the second terminal of the first TCP option information included in the first TCP option information notifying message, upon receiving the first TCP option information notifying message from the option information notifying unit.

An aspect of the present invention concerning a server that relays packet data transmitted and received between a first terminal and a second terminal includes a connection establishment message processing unit configured to transmit a first SYN ACK message, that is a response message to a first SYN message transmitted from the first terminal for establishing a TCP connection, upon receiving the first SYN message from the first terminal, and an option information notifying unit configured to transmit a first TCP option information notifying message that includes first TCP option information included in the first SYN message from the first terminal and first communication destination information which indicates the second terminal as a destination of communication, wherein the option information notifying unit transmits the first TCP option information notifying message to the first terminal so that the first terminal recognizes the second terminal as the destination of communication and notifies the second terminal of the first TCP option information.

An aspect of the present invention concerning a terminal that transmits and receives packet data with another terminal via a server, wherein the terminal transmits a SYN message to the server and receives a TCP option information notifying message that includes TCP option information included in the SYN message and communication destination information which indicate the other terminal as a destination of communication, wherein the terminal recognizes the other terminal as the destination of communication and notifies the other terminal of the TCP option information included in the TCP option information notifying message, upon receiving the TCP option information notifying message from the server.

An aspect of the present invention concerning a packet data transferring method, with which a communication system, having a plurality of terminals and a server that relays packet data transmitted and received between a first terminal and a second terminal among the plurality of terminals, transmits packet data, the method includes a connection establishment message processing operation including transmitting, from the server to the first terminal, a first SYN ACK message that is a response message to a first SYN message transmitted from the first terminal for establishing a TCP connection, upon receiving the first SYN message from the first terminal, an option information notifying operation including transmitting, from the server to the first terminal, a first TCP option information notifying message that includes first TCP option information included in the first SYN message from the first terminal and first communication destination information which indicates the second terminal as a destination of communication, a first recognizing operation including recognizing, by the first terminal, the second terminal as the destination of communication based on the first communication destination information included in the first TCP option information notifying message transmitted by the option information notifying operation, and a first notifying operation including notifying, by the first terminal, the second terminal of the first TCP option information included in the first TCP option information notifying message, upon receiving the first TCP option information notifying message transmitted by the option information notifying operation.

An aspect of the present invention concerning a computer readable medium having embodied thereon a program, which when executed by a computer serving as a server that relays packet data transmitted and received between a first terminal and a second terminal, the program causes the computer to execute a method includes transmitting a first SYN ACK message, that is a response message to a first SYN message transmitted from the first terminal for establishing a TCP connection, upon receiving the first SYN message from the first terminal, and transmitting a first TCP option information notifying message that includes first TCP option information included in the first SYN message from the first terminal and first communication destination information which indicates the second terminal as a destination of communication, wherein the first TCP option information notifying message is transmitted to the first terminal so as to enable the first terminal to recognize the second terminal as the destination of communication, and the first terminal notifies the second terminal of the first TCP option information.

Another aspect of the present invention concerning a computer readable medium having embodied thereon a program, which when executed by a computer serving as a terminal that transmits and receives packet data with another terminal via a server, the program causes the computer to execute a method includes transmitting a SYN message to the server, receiving a TCP option information notifying message that includes TCP option information included in the SYN message and communication destination information which indicates the other terminal as a destination of communication, recognizing the other terminal as the destination of communication based on the communication destination information included in the received TCP option information notifying message, and notifying the other terminal of the TCP option information included in the TCP option information notifying message, upon receiving the TCP option information notifying message.

BRIEF DESCRIPTION OF THE DRAWINGS

The above and other aspects of the present invention will become more apparent from the following detailed description of embodiments taken in conjunction with the accompanying drawings, in which:

FIG. 2 is a diagram showing an example of a transfer table, according to the first embodiment.

FIG. 3 is a diagram showing an example of an address-option correspondence management table, according to the first embodiment.

FIG. 10 is a diagram showing an example of a TCP splicing packet transfer system.

DETAILED DESCRIPTION OF EMBODIMENTS OF THE INVENTION

Hereinafter, an example of configuration and operation of a communication system according to a first embodiment of the present invention is explained.

Figure 1:
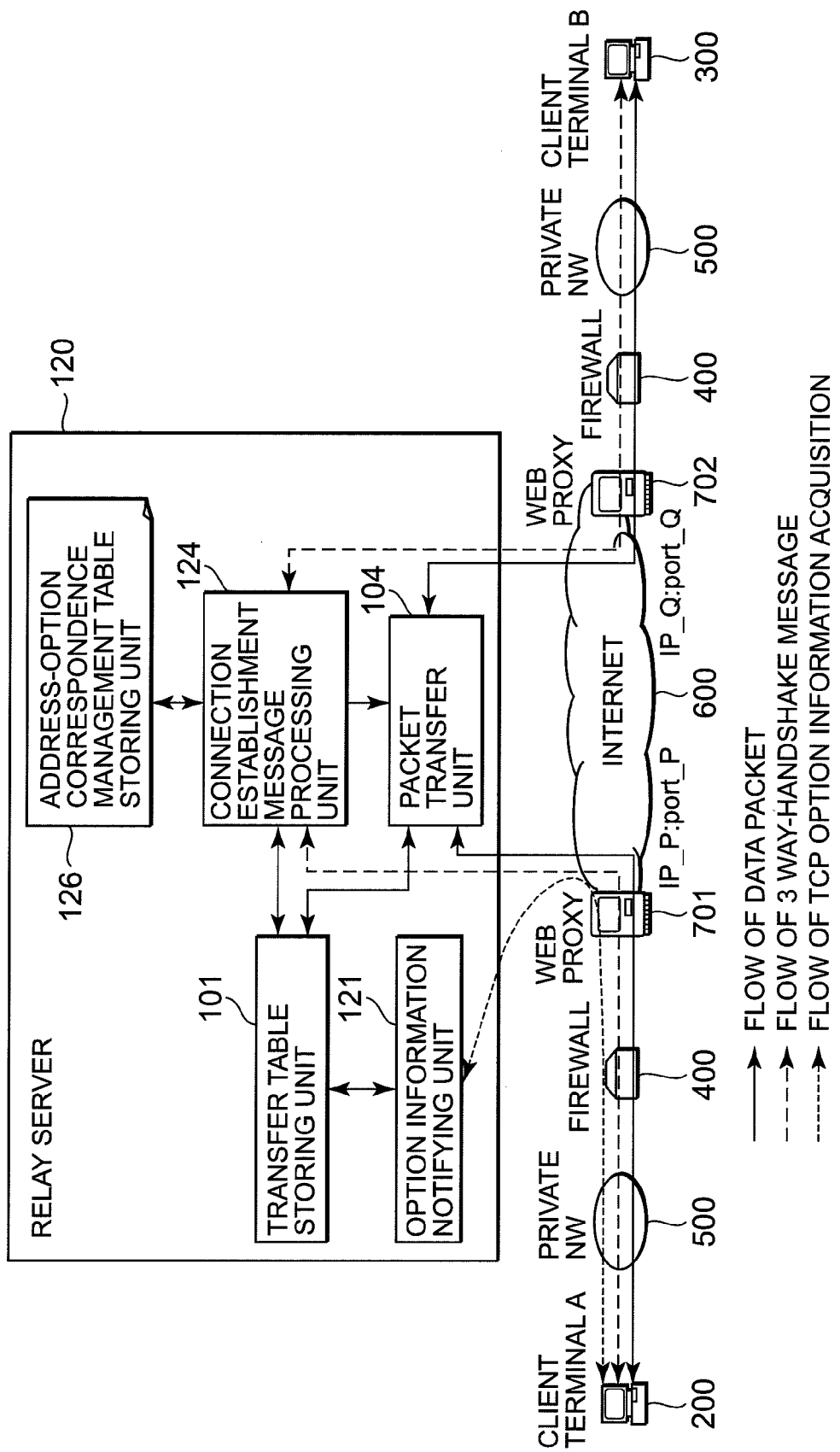
FIG. 1 is a diagram showing an example of a configuration of a communication system according to a first embodiment of the present invention.

FIG. 1 shows an example of a configuration of the communication system according to the first embodiment. The communication system of the first embodiment includes a relay server 120, a client terminal A 200, a client terminal B 300, firewalls 400, private networks 500, an Internet 600, and Web Proxies 701 and 702.

The firewalls 400 are a device that block connection to the private networks 500 from an external. For example, setting is made to allow the communication on a TCP connection established from a terminal (client terminal A200, client terminal B300 or the like) connected to the private networks 500 to a terminal connected to the Internet 600.

The client terminal A 200 and the client terminal B 300 perform communication via the relay server 120. The client terminal A 200 and the client terminal B 300 cannot directly establish a TCP connection with the relay server 120, and firstly establishes a TCP connection with Web Proxies 701 and 702, respectively. Then, the Web Proxies 701 and 702 establish a TCP connection with the relay server 120. Each of the client terminals A 200 and B 300 transmits data to be transmitted to the communicating client terminal by using the TCP connection established with the each of Web Proxies 701 and 702. Thereafter, each of the Web Proxies 701 and 702 transfers data received by the TCP connection to the TCP connection established with the relay server 120. The relay server 120 receives data transmitted by the client terminals A 200 and B 300 using the TCP connection established with each of the Web Proxies 701 and 702.

The relay server 120 includes a transfer table storing unit 101, a connection establishment message processing unit 124, an address-option correspondence management table storing unit 126, an option information notifying unit 121, and a packet transfer unit 104.

The transfer table storing unit 101 stores a transfer table. In the transfer table, there is registered information necessary for transferring a data packet received by the relay server 120. More specifically, upon receipt of the data packet, the relay server 120 judges a transfer destination of the data packet and performs a rewriting process of a packet header. Here, information necessary for the transfer destination judgment and rewriting process are registered for every pair of client terminals that perform communication with each other.

FIG. 2 shows an example of the transfer table stored in the transfer table storing unit 101. Referring to FIG. 2, in the transfer table, there are registered an entry number, connection address information, and transfer start time Seq number information.

In the connection address information, there are registered IP addresses and port numbers of the client terminal side and the relay server 120 side, respectively, of the TCP connection that is used when the relay server 120 relays communication between the client terminals A 200 and B 300. It should be noted that the IP address and port number to be registered on the client terminal side are not limited to the IP address and port number of the client terminal itself. In the example shown in FIG. 1, as connection address information of the client terminal side, there are registered an IP address and a port number of the Web Proxy 701 of the client terminal A 200 side and those of the Web Proxy 702 of the client terminal B 300 side.

In the transfer start time Seq number information, there is registered a Seq number of packets that have been transmitted from the client terminal and the relay server 120, at the time of starting processing for transferring, to the other connection, a data packet received from one connection. In an entry 123456 in FIG. 2, it is registered as information on connection 1 side that the Web Proxy 701 of the client terminal A 200 side has transmitted packets up to Seq number: a +1, and the relay server 120 has transmitted packets up to Seq number: b+1, before the start of transfer.

The option information notifying unit 121 notifies the client terminal of TCP option information (a message which is used to notify the client terminal of TCP option information is hereinafter called a TCP option information notification message) which is presented to the relay server 120 by a node that terminates the TCP connection between the client terminal and the relay server 120 and directly transmits a SYN message to the relay server 120 ("TCP connection termination node"). In the first embodiment the Web Proxy 701 and the Web Proxy 702 are examples of the TCP connection termination node. For example, in the case of the configuration shown in FIG. 1, the option information notifying unit 121 notifies the client terminal A 200 of the TCP option information described in the SYN message that the Web Proxy 701 transmits to the relay server 120 according to a request from the client terminal A 200.

After (not limited to immediately after) transmission and reception of a 3WH message between the relay server 120 and the TCP connection termination node is completed, the option information notifying unit 121 transmits a TCP option notifying message using a connection address used to transmit and receive the 3WH message. Since the TCP connection is terminated between the client terminal and the relay serer 120, the relay server 120 cannot judge by which terminal the transmission of the SYN message received from the TCP connection termination node is requested. However, by using the connection address used to transmit and receive the 3WH message to and from the TCP connection termination node, the relay server 120 can transmit the TCP option notifying message to a request source client terminal.

The connection establishment message processing unit 124 transmits and receives a message for establishing a TCP connection, that is, 3WH message, to and from the TCP connection termination node. Further, the connection establishment message processing unit 124 registers, in the transfer table, a pair of connection addresses of the TCP connection by which data packet is transferred. Moreover, the connection establishment message processing unit 124 provides an instruction to the packet transfer unit 104 on timing at which the packet received from the client terminal is started to be transferred. And before starting the transfer, the connection establishment message processing unit 124 records, in the transfer table, Seq numbers of data packets that have been transmitted by the client terminal and the relay server 120 respectively, by using the connection address used to transmit and receive the 3WH message. The following will explain the specific processing contents.

First, an explanation will be given of transmission and reception processing of the 3WH message. The relay server 120 holds multiple pairs of IP address and port number ("TCP connection waiting address") to be used to receive the SYN message. When receiving a SYN message from the TCP connection termination node, the connection establishment message processing unit 124 decides TCP option information to be included in the SYN ACK message that is to be transmitted in response to the SYN message according to the TCP connection waiting address used to receive the SYN message. The type of TCP option information which is included, in the SYN ACK message, according to the TCP connection waiting address, is registered beforehand in the later-described address-option correspondence management table that is stored in the address-option correspondence management table storing unit 126. The connection establishment message processing unit 124 decides TCP option information to be included in the SYN ACK message with reference to the address-option correspondence management table. The connection establishment message processing unit 124 sets a transmission source address of a SYN ACK message to be transmitted to a TCP connection waiting address used to receive the SYN message corresponding to the SYN ACK message, and sets a destination address of the SYN message to a transmission source address of the SYN message.

Next, an explanation will be given of registration of the connection address pair to the transfer table. After completing transmission and reception of the 3WH message to and from the TCP connection termination node, the connection establishment message processing unit 124 receives a connection pair notification message using the connection address used to transmit and receive the 3WH message. In the connection pair notification message, there is included a pair ID that uniquely identifies the pair of connection addresses by which the data packet is transferred. When receiving the connection pair notification message, the connection establishment message processing unit 124 registers, in the transfer table, the connection address and the pair ID used in reception.

Next, explanation will be given of an instruction on transfer start timing. After (not limited to immediately after) receiving the connection pair notification messages having the same pair IDs from two different connection addresses, the connection establishment message processing unit 124 instructs the packet transfer unit 104 to start transferring the data packet.

Moreover, in the transfer table, there is registered information regarding to which Seq numbers the packets have been transmitted by the TCP connection termination node and the relay server 120, respectively, by using the connection address registered in the transfer table just before the start of data packet transfer.

In the address-option correspondence management table stored in the address-option correspondence management table storing unit 126 as shown in FIG. 3, there is registered TCP option information to be included in the SYN ACK message that is transmitted by the connection establishment message processing unit 124 for every TCP connection waiting address to be used to receive the SYN message. FIG. 3 shows an example of the address-option correspondence management table stored in the address-option correspondence management table storing unit 126. In the example shown in FIG. 3, when receiving a SYN message from the TCP connection termination node, directed to IP_X2: Port_X, the connection establishment message processing unit 124 transmits to the TCP connection termination node a SYN ACK message including TCP option information which is WS: on 0. Additionally, in FIG. 3, as TCP option information, only WS is registered, but it is not limited to WS. MSS or SACK may be registered, or a combination of multiple TCP options may be registered. There is a case where the number of TCP connection waiting addresses registered in the address-option correspondence management table is larger than the example shown in FIG. 3.

The packet transfer unit 104 performs rewriting of an IP header and a TCP header of the packet that the relay server 120 has received from the TCP connection termination node, and transfers the packet to the other TCP connection termination node. The specific processing content is as follows.

When receiving a data packet, the packet transfer unit 104 searches the transfer table for an entry which has a connection address matching the transmission source IP address and the port number, and the destination IP address and the port number of the received packet. Thereafter by referring to the searched entry ("received packet correspondence entry"), the packet transfer unit 104 rewrites the transmission source IP address, the port number, the destination IP address, the port number, Seq number and the Ack number as follows, and transmits them to the network after recalculating a checksum.

Transmission Source IP Address and Port Number

Among the connection addresses registered in the received packet correspondence entry, there is a connection address ("transfer destination connection address") which is not used for receiving packets (hereinafter "transmission source connection address"). In the transfer table shown in FIG. 2, when the received packet correspondence entry is an entry 123456 and the transmission source connection address is a connection address of connection 1, IP_X and Port_X of server-side address information of connection 2 side are used as a transmission source IP address and port numbers, respectively.

Destination IP Address and Port Number

Address information on the terminal side of the transfer destination connection address is used as a destination IP address and a port number. In the aforementioned case, IP_B and Port_B are used as a destination IP address and a port number.

Seq Number and Ack Number

Seq number: Seq number of received packet−Seq number of client terminal side of transmission source connection described in received packet correspondence entry+Seq number of server side of transfer destination connection described in received packet correspondence entry.

Ack number: Ack number of received packet−Seq number of server side of transfer source connection described in received packet correspondence entry+Seq number of client terminal side of transfer destination connection described in received packet correspondence entry.

Next, an operation of a communication system according to the first embodiment will be explained.

Figure 4:
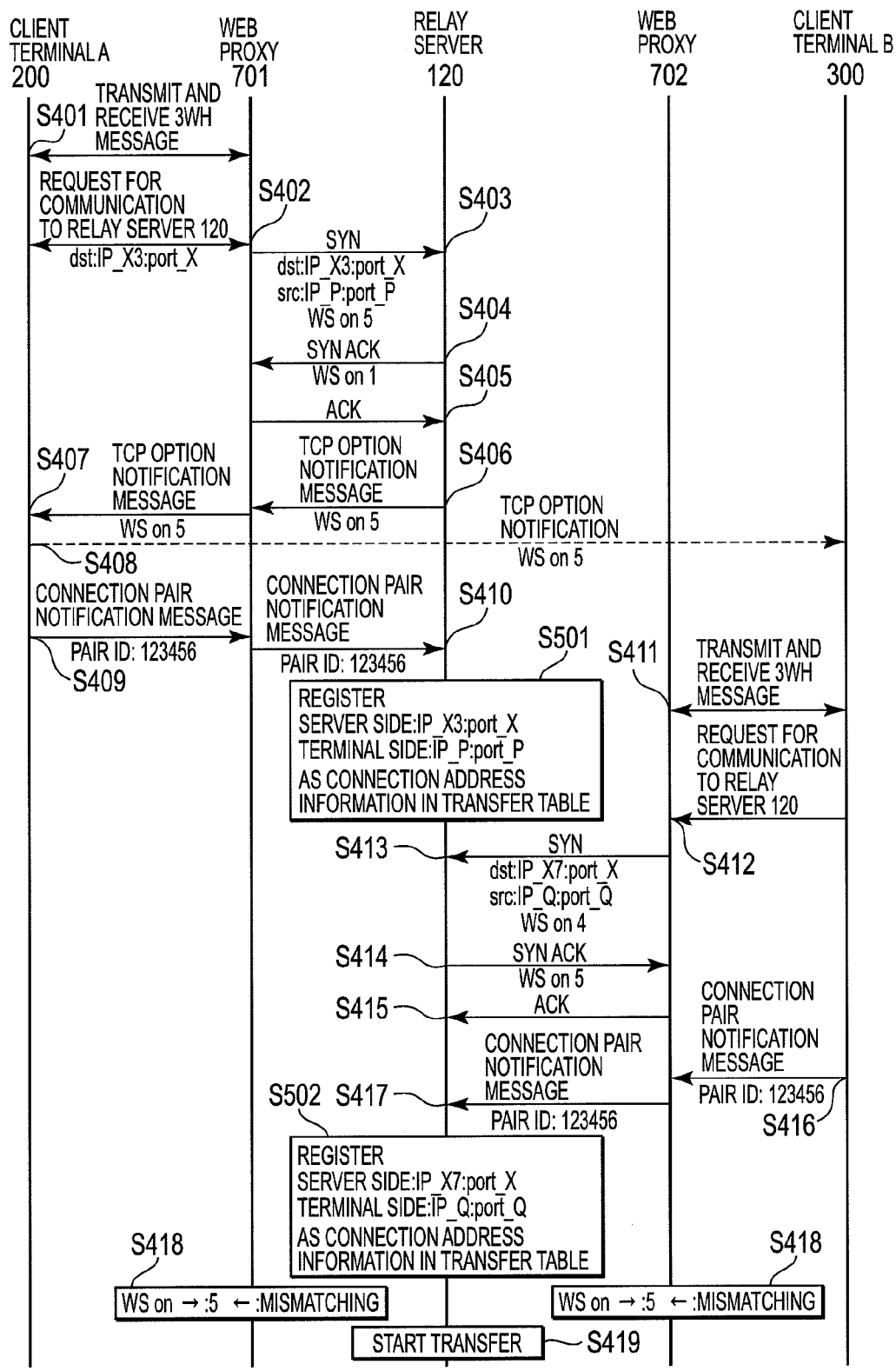
FIG. 4 is a diagram showing an example of a message sequence starting from a terminal before data transfer is started, according to the first embodiment.

FIG. 4 shows an example of a message sequence starting from the client terminal A 200 as an example of operation of the communication system according to the first embodiment of which configuration is shown in FIG. 1. Note that, in this example of operation, it is assumed that information shown in FIG. 3 is registered in the address-option correspondence management table.

First of all, the client terminal A 200 establishes a TCP connection with the Web Proxy 701 (S401), and designates a TCP connection waiting address of the relay server 120 to request the Web Proxy 701 to establish a TCP connection with the relay server 120 (S402). In S402, the TCP connection waiting address designated by the client terminal A 200 may be randomly selected. In the example in FIG. 4, IP_X3:Port_X are designated.

After S402, the Web Proxy 701 transmits a SYN message to the relay server 120 to start establishing a TCP connection (S403). In the example in FIG. 4, in S403, a TCP option presented to the relay server 120 by the Web Proxy 701 is WS: on, 5-bit shift.

After receiving the SYN message, the connection establishment message processing unit 124 transmits, to the Web Proxy 701, a SYN ACK message including TCP option information (WS: on, 1-bit shift in the address-option correspondence management table shown in FIG. 3) corresponding to a TCP connection waiting address (IP_X3:Porx_X) used to receive the SYN message, with reference to the address-option correspondence table (S404). Here, even though the TCP option included in the SYN ACK message to the Web Proxy 701 is decided based on the address-option correspondence management table in the above described example, the present invention is not limited to this way. For example, a certain TCP option information (for example, WS: on, 2-bit shift) may always be included in the SYN ACK message to the Web Proxy 701 regardless of the TCP connection waiting address, since the TCP option information included in the SYN ACK message to the Web Proxy 701 is used as a dummy.

After S404, an ACK message in response to the SYN ACK message is transmitted from the Web Proxy 701 (S405) and transmission and reception of the 3WH message between the Web Proxy 701 and the relay server 120 is completed.

After completion of transmission and reception of the 3WH message between the Web Proxy 701 and the relay server 120, the option information notifying unit 121 transmits a TCP option information notification message including TCP option information presented by the Web Proxy 701 which is an example of the TCP connection termination node, and information to indicate the destination of communication. In this example, the destination of communication is client terminal B 300. The transmission of the TCP option information notification message is performed by using the connection address used to transmit and receive the 3WH message with the TCP connection termination node (Web Proxy 701) (S406). This message is transferred to the client terminal A 200 by the Web Proxy 701 (S407). Additionally, in the TCP option information notification message that the option information notifying unit 121 transmits, there may be included a TCP connection waiting address instead of the TCP option information presented from the Web Proxy 701. Here, the TCP connection waiting address corresponds to the TCP option information registered in the address-option correspondence table, (WS: on, IP_X7:Port_X and corresponding to 5-bit shift in the example shown in FIG. 3).

Upon receiving the TCP option notification message, the client terminal A 200 recognizes that the destination of communication is the client terminal B 300 and notifies the client terminal B 300 of the TCP option included in the TCP option notification message or the TCP option corresponding to the TCP connection waiting address included in the TCP option notification message (S408). As methods for notifying the client terminal B of the TCP option, such methods as using Session Initiation Protocol (SIP), email or the like are available. Notification to the client terminal B 300 may not always be made via the relay server 120.

Moreover, after requesting the Web Proxy 701 to perform communication to the relay server 120 in S402, the client terminal A 200 transmits a connection pair notification message by using the TCP connection established with the Web Proxy 701 in step S401 (S409). In the connection pair notification message, there is included a connection pair ID (123456) based on agreement between the client terminal A 200 and the client terminal B 300 established in advance. This message is transferred to the relay server 120 by the Web Proxy 701, and the relay server 120 receives it by using the connection address used to transmit and receive the 3WH message to and from the Web Proxy 701 in S403 to S405 (S410).

After receiving the connection pair notification message, the connection establishment message processing unit 124 registers the connection addresses (terminal side: IP_P: Port_P, server side IP_X3:Port_X) used to receive the connection pair notification message in the entry of the transfer table having the same entry ID (for example "123456", in FIG. 4) as the connection pair ID notified by the connection pair notification message in S410 (S501).

When receiving a notification of a TCP option or TCP connection waiting address from the client terminal A 200 in S408, the client terminal B 300 performs transmission and reception of the 3WH message to and from the Web Proxy 702 to establish a TCP connection (S411). After that, the client terminal B 300 requests the Web Proxy 702 to establish the TCP connection with the relay server 120 (S412). The address of the relay server 120 as a TCP connection establishment destination designated by the client terminal B 300 in S412 is a TCP connection waiting address (IP_X7:Port_X) of the relay server 120 notified from the client terminal A 200 in S408. Note that, when the TCP option is notified in S408, the TCP connection waiting address of the relay server 120 corresponding to the option is designated as an address of the TCP connection establishment destination. In this case, the client terminal B 300 holds the same information as that of the address-option correspondence table that the relay server 120 has in advance.

After S412, the Web Proxy 702 transmits a SYN message to the relay server 120 and starts establishing the TCP connection (S413). In the example of FIG. 4, the TCP option presented to the relay server 120 by the Web Proxy 702 in S413 is WS: on, 4-bit shift.

After receiving the SYN message, the connection establishment message processing unit 124 transmits, to the Web Proxy 702, a SYN ACK message which includes TCP option information (WS: on, 5-bit shift count in the address-option correspondence management table shown in FIG. 3) corresponding to the TCP connection waiting address (IP_X7: Port_X) used to receive the SYN message, by referring to the address-option correspondence management table (S414). In other words, the Web Proxy 701 on the client terminal A 200 side presents, to the Web Proxy 702 on the client terminal B 300 side, the same TCP option information as the TCP option information presented by the SYN message in S403 by the SYN ACK message from the relay server 120. After S414, the ACK message in response to the SYN ACK message is transmitted from the Web Proxy 702 (S415) and transmission and reception of the 3WH message between the Web Proxy 702 and the relay server 120 are completed.

After S412, the client terminal B 300 transmits a connection pair notification message by using the TCP connection established with the Web Proxy 702 in S411 (S416). In the connection pair notification message, there is included a connection pair ID which was agreed with the client terminal A 200 in advance (the same value as the pair ID 123456 designated by the client terminal A 200 in S409 is included in the example of FIG. 4). The present message is transferred to the relay server 120 by the Web Proxy 702. The relay server 120 receives the message by using the connection address used to transmit and receive the 3WH message from and to the Web Proxy 702 in S413 to 415 (S417).

Similar to S501, the connection establishment message processing unit 124 registers connection addresses (terminal side IP_Q:Port_Q, server side IP_X7:Port_X) at which the connection pair notification message is received in the entry of the transfer table having the same entry ID (123456) as the connection pair ID notified by the connection pair notification message in S417. As a result, in the entry of the transfer table (ID: 123456), there are registered, as connection address information, address information having address of terminal side IP_P:Port_P, server side IP_X3:Port_X, and address information having address of terminal side IP_Q:Port_Q, server side IP_X7:Port_X.

As a result of the aforementioned operation, the TCP option value (WS: on, 5-bit shift) presented by the Web Proxy 701 on the client terminal A 200 side is presented to the Web Proxy 702 on the client terminal B 300 side. On the other hand, the TCP option value (WS: on, 1-bit shift) which is different from the TCP option value (WS: on, 4-bit shift) presented by the Web Proxy 702 on the client terminal B 300 side is presented to the Web Proxy 701 on the client terminal A 200 side (S418).

As a result, after the relay server 120 starts packet transfer (S419), an advertisement Window size notified by the Web Proxy 701 on the client terminal A 200 side is interpreted, by the Web Proxy 702 on the client terminal B 300 side, as intended by the Web Proxy 701 on the client terminal A 200 (namely, a value after 5-bit shift is an advertisement Window size). Therefore, communication speed to the client terminal A 200 from the client terminal B 300 is increased as compared with a case in which WS is unused.

On the other hand, regarding communication from the client terminal A 200 to the client terminal B 300, an advertisement Window size notified by the Web Proxy 702 on the client terminal B 300 side may not be interpreted as intended by the Web Proxy 701 on the client terminal A 200 side, thus there is a possibility that communication is disabled. However, this can be solved by executing the message sequence shown in FIG. 4 in which the client terminal B 300 is set as a starting point, so that the TCP option presented by the Web Proxy 702 on the client terminal B 300 side is presented to the Web Proxy 701 on the client terminal A 200 side.

In this case, each of the client terminals A 200 and the client terminal B 300 establishes two connections with the Web Proxies 701 and 702 for communication between the client terminal A 200 and the client terminal B 300. One is a TCP connection established between the Web Proxies 701 and 702 by each client terminal in the message sequence in which the client terminal B 200 is set as a starting point as shown in FIG. 4. Data transmission is performed using the present TCP connection, thereby increasing communication speed from the client terminal B 300 to the client terminal A 200. Note that TCP options are not matched from the client terminal A 200 to the client terminal B 300, and there is a possibility that packet transmission (data transmission) including a payload may not be performed. However, in such a case, the client terminal A 200 performs transmission of ACK packet including no payload.

Figure 5:
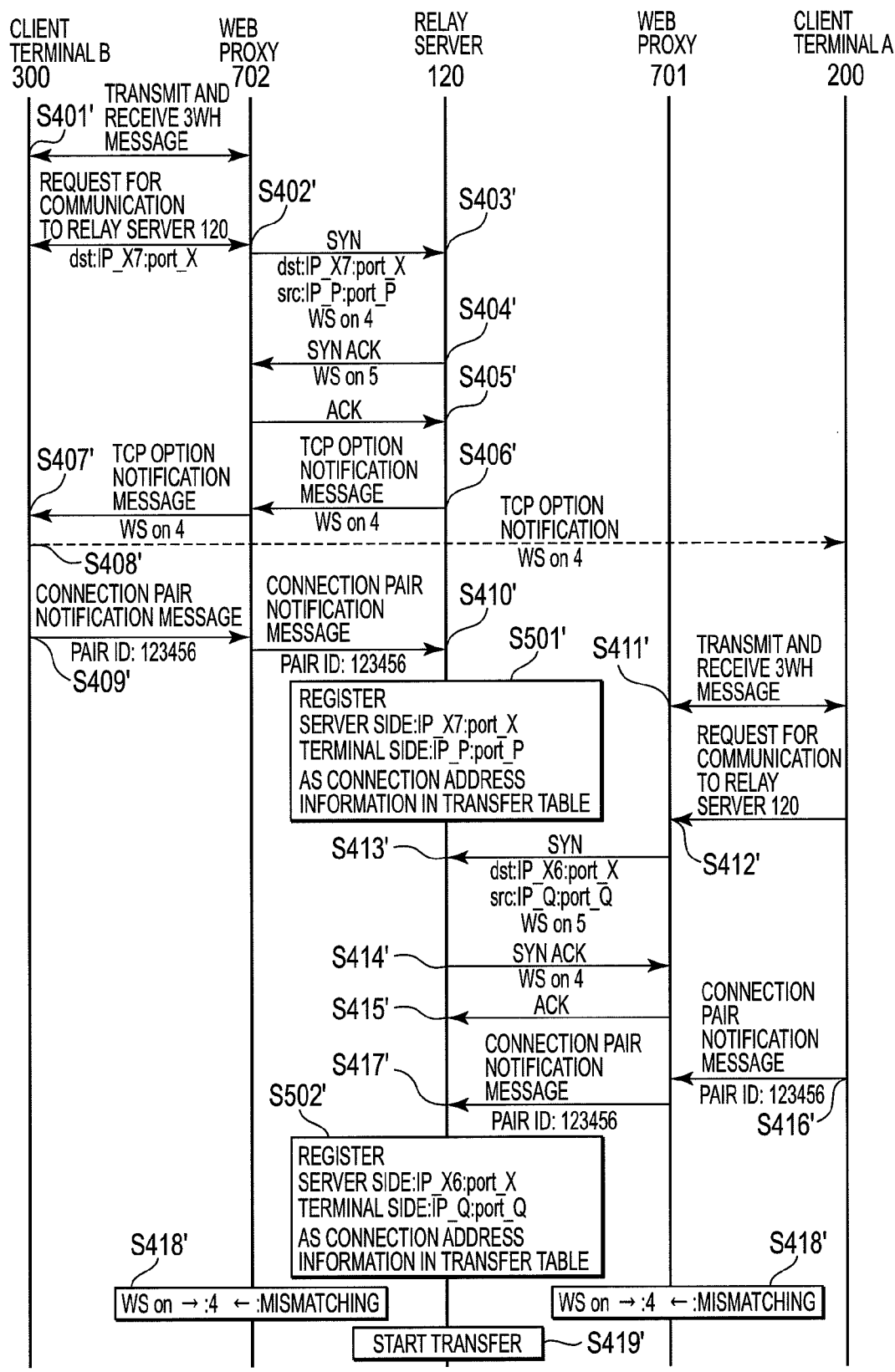
FIG. 5 is a diagram showing an example of a message sequence starting from another terminal before data transfer is started, according to the first embodiment.
Figure 6:
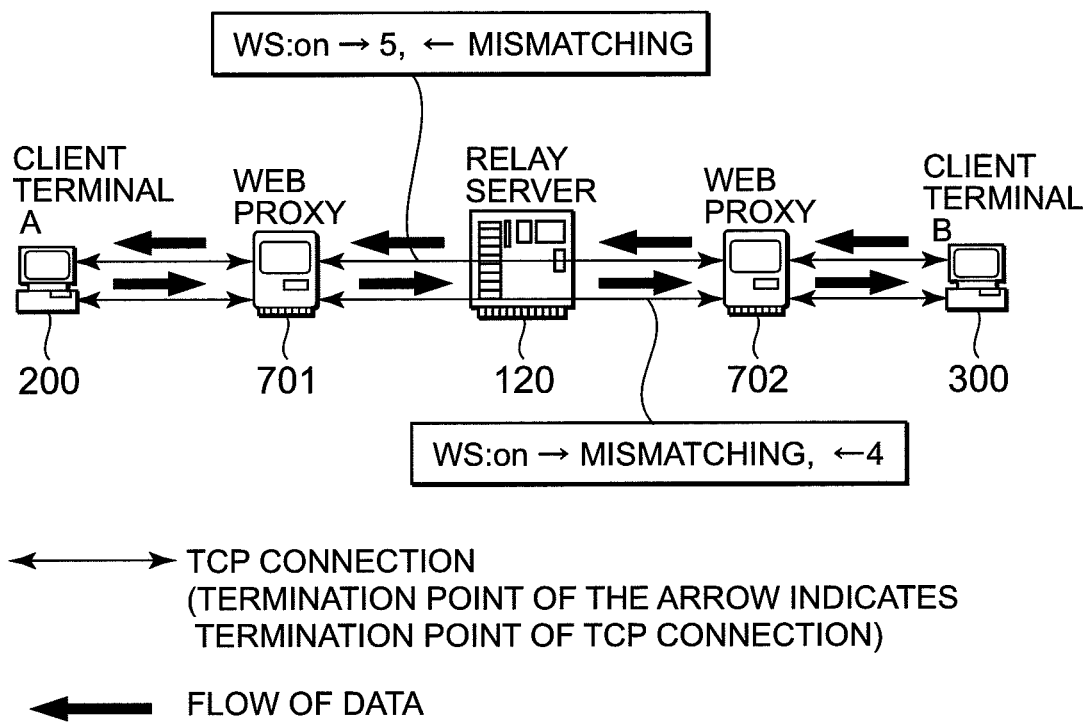
FIG. 6 is a diagram showing an example of establishment of a TCP connection, according to the first embodiment.

The other connection is a TCP connection established between each client terminal and Web Proxies 701 and 702 by performing the message sequence shown in FIG. 4 in which the client terminal B 300 is set as a starting point. Specifically, the message sequence starting from the client terminal B 300, as is described in FIG. 5, is performed. Since each operation of FIG. 5 is the same as the corresponding operation that is described in FIG. 4 except the performer of each operation and the value of TCP option, more detailed explanation is omitted. Here, as is described in FIG. 6, the client terminal A 200 performs data transmission by using this present TCP connection, thereby increasing communication speed from the client terminal A 200 to the client terminal B 300.

Note that processing of the relay server 120 shown in FIG. 1 may be performed by a logic circuit manufactured according to its purpose. Moreover, a program describing the processing contents may be recorded on a recording medium that is readable by the relay server 120, and the program recorded on the recording medium may be read into the relay server 120 and executed. The recording medium readable by the relay server 120 indicates a removable recording media such as a floppy disk (registered trademark), a magnetic optical disk, DVD, CD, or the like, or indicates a HDD or the like that is built into the relay server 120. The program recorded on the recording medium is read by a CPU (not shown) in the relay server 120, and the same processing as mentioned above is performed by control of the CPU. Here, the relay server 120 operates as a computer that executes the program read from the recording medium on which the program is recorded.

According to the first embodiment of the present invention, in the communication system in which the client terminals perform communication via the relay server, there is a node that terminates the TCP connection between each of the client terminals and the relay server (i.e. the TCP connection termination node). When the TCP connection termination nodes start to establish the TCP connection with the relay server, TCP option information described in the SYN message transmitted to the relay server by one TCP connection termination node is presented to another TCP connection termination node. Therefore, the TCP connection termination nodes can match the TCP options with each other in the communication system in which the communication via the relay server is performed.

The reason for the above describe advantage is as follows. The option information notifying unit in the relay server notifies the client terminal of TCP option information included in a SYN message transmitted to the relay server by a TCP connection termination node or notifies a TCP connection waiting address corresponding to the TCP option information. Then, the client terminal notifies a client terminal being a communication destination of the terminal of TCP option information notified from the relay server or a TCP connection waiting address corresponding to the TCP option information. The client terminal being a communication destination of the client terminal requests communication to a TCP connection waiting address corresponding to the TCP option information of the relay server. Then, the connection establishment message processing unit in the relay server decides TCP option information to be included in a SYN ACK message to be transmitted in response to the SYN message according to the address used for receiving the SYN message.

Hereinafter, a configuration of a communication system according to a second embodiment of the present invention is explained.

Figure 7:
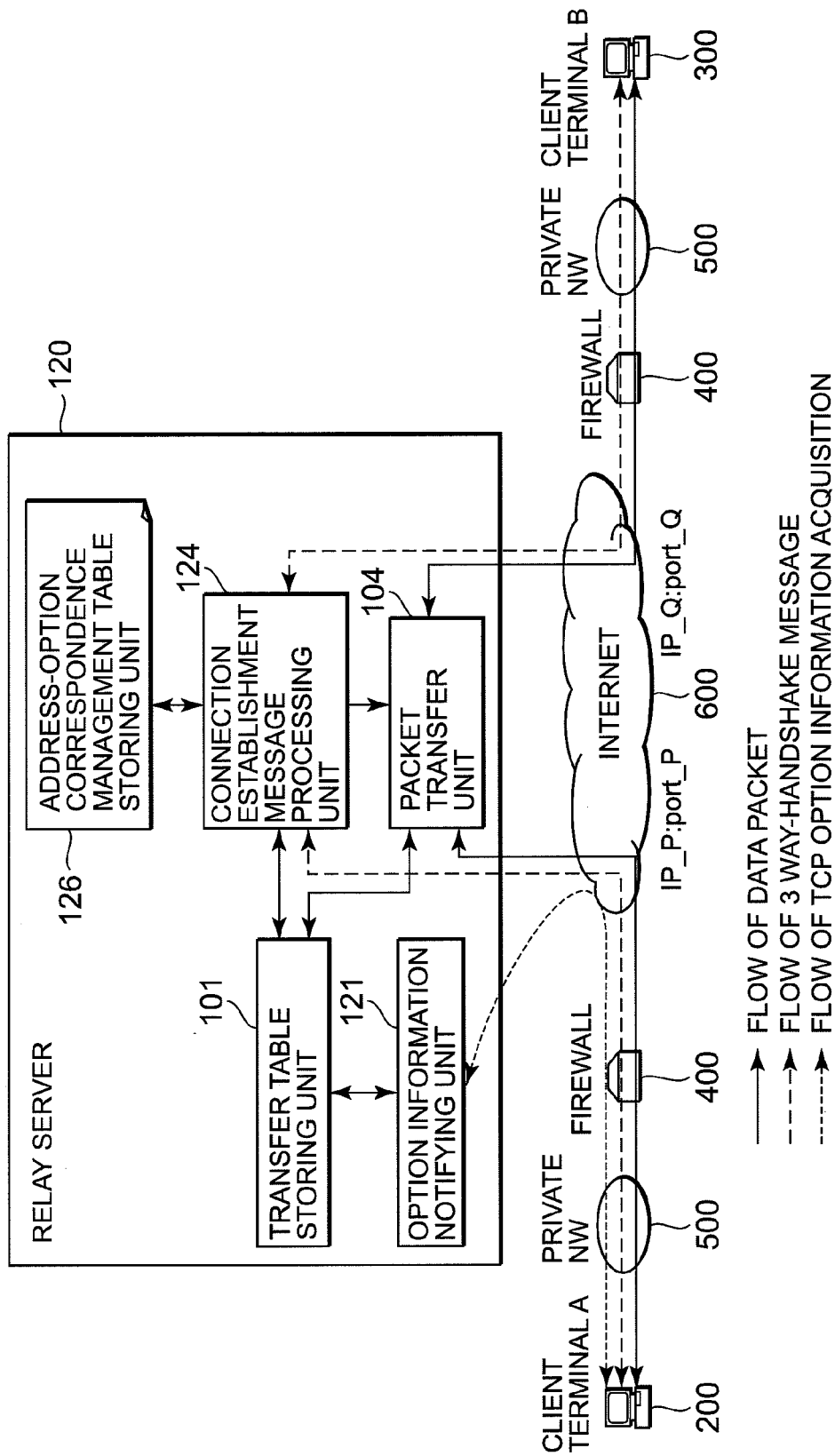
FIG. 7 is a diagram showing an example of a configuration of a communication system according to a second embodiment of the present invention.

FIG. 7 shows an example of a second embodiment of the present invention. The configuration of the second embodiment is different from the configuration of the first embodiment in that the Web Proxy 701 and the Web Proxy 702 do not exist and each client terminal directly performs communication with the relay server. In this case, the IP address and port number of each client terminal is described in the connection address information of the transfer table of the relay server. Moreover, the connection establishment message processing unit directly performs transmission and reception of the 3WH message between each client terminal.

Figure 8:
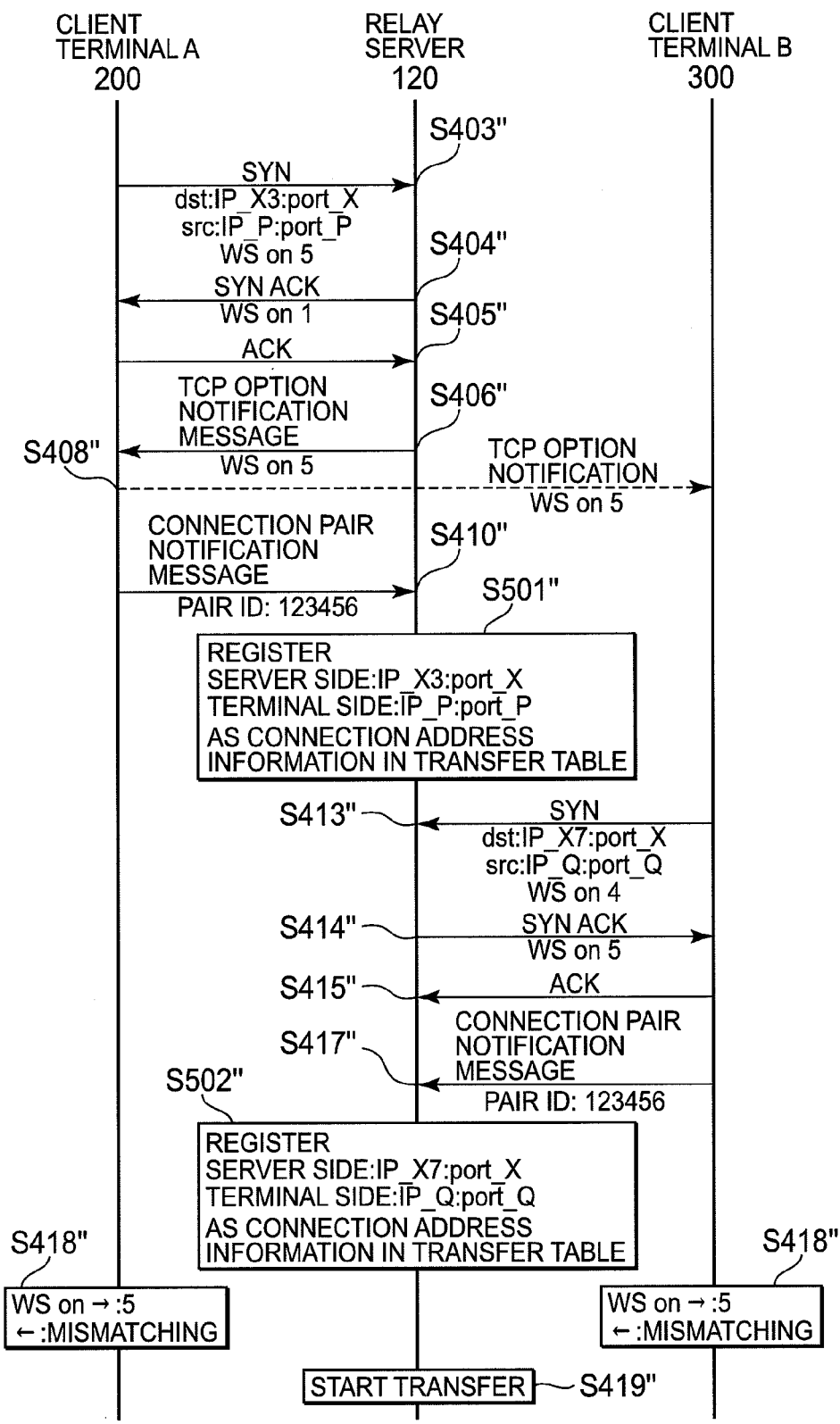
FIG. 8 is a diagram showing an example of a message sequence starting from a terminal before data transfer is started, according to the second embodiment.
Figure 9:
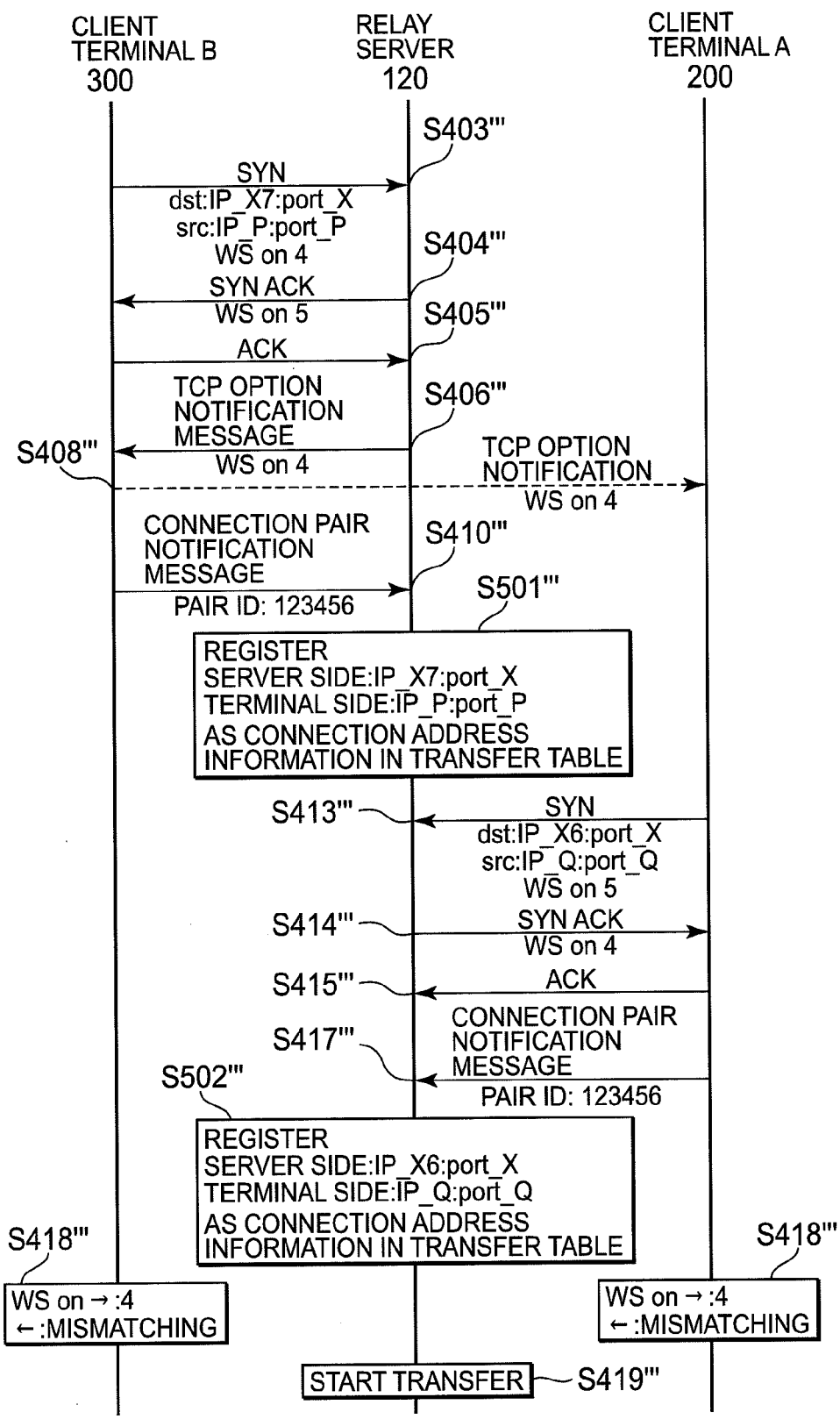
FIG. 9 is a diagram showing an example of a message sequence starting from another terminal before data transfer is started, according to the second embodiment.

FIG. 8 and FIG. 9 show examples of a message sequence starting from the client terminal A 200 and the client terminal B 300, respectively, as examples of operation of the communication system according to the second embodiment. Since each operation of FIG. 8 and FIG. 9 except the performer of each operation is similar to the corresponding operation that is described in FIG. 4 and FIG. 5, respectively, more detailed explanation is omitted.

According to the second embodiment, the client terminals and the relay server can mach the TCP options even if each client terminal directly performs communication with the relay server, but without the TCP connection termination node.

As explained above, according to the embodiments of present invention, a configuration is adopted in which a SYN ACK message is generated that includes TCP option information associated with a TCP connection waiting address used to receive a SYN message, the SYN ACK message is transmitted to a transmission source IP address and a transmission source port number of the SYN message, and a TCP option information notification message, which includes at least one of TCP option information included in the received SYN message and a TCP connection waiting address associated with the TCP option information, is transmitted to the transmission source IP address and the transmission source port number of the SYN message. Therefore, it is possible to prevent a reduction in throughput due to mismatching of TCP options between terminals that perform communication via a relay server.

While the embodiments of the present invention has been described in detailed above, it is contemplated that the numerous modifications may be made to the above embodiment without departing from the spirit and scope of the embodiments of the present invention as defined in the following claims.

What is claimed is:
1. A communication system comprising:
a plurality of terminals; and
a server that relays packet data transmitted and received between a first terminal and a second terminal among the plurality of terminals, wherein the first terminal transmits a first SYN message to the server for establishing a first TCP connection and the second terminal transmits a second SYN message to the server for establishing a second TCP connection,
wherein the server comprises:
a connection establishment message processing unit that transmits by a non-transitory processor a first SYN ACK message, that is a response message to the first SYN message transmitted from the first terminal for establishing a TCP connection, upon receiving the first SYN message from the first terminal; and
an option information notifying unit that transmits by the non-transitory processor a first TCP option information notifying message that includes first TCP option information included in the first SYN message from the first terminal and first communication destination information which indicates the second terminal as a destination of communication,
wherein the first terminal recognizes the second terminal as the destination of communication and notifies the second terminal of the first TCP option information included in the first TCP option information notifying message, upon receiving the first TCP option information notifying message from the option information notifying unit; and an address-option correspondence management table storing unit that stores by the non-transitory processor an address-option correspondence management table in which a TCP connection waiting address, which includes an IP address and a port number, and second TCP option information are registered in association with each other, wherein the connection establishment message processing unit transmits a second SYN ACK message which is a response message to the second SYN message transmitted from the second terminal, including the second TCP option information, which is associated with the TCP connection waiting address including the IP address and the port number used to receive the first SYN message from the first terminal.

2. The communication system according to claim 1, wherein the first terminal notifies the second terminal of the first TCP option information via the server.

3. The communication system according to claim 1, wherein the first terminal directly notifies the second terminal of the first TCP option information.

4. The communication system according to claim 1, wherein the first TCP option information included in the first TCP option information notifying message is used when performing communication from the second terminal to the first terminal.

5. The communication system according to claim 1, wherein the second terminal transmits a second SYN message to the server by using the IP address and the port number included in the TCP connection waiting address, the TCP connection waiting address being associated with the first TCP option information.

6. The communication system according to claim 1, wherein the option information notifying unit further transmits a second TCP option information notifying message that includes third TCP option information included in a second SYN message from the second terminal and second communication destination information which indicates the first terminal as a destination of communication,
wherein the second terminal recognizes the first terminal as the destination of communication and notifies the first terminal of the third TCP option information included in the second TCP option information notifying message, upon receiving the second TCP option information notifying message from the option information notifying unit.

7. The communication system according to claim 6, wherein the third TCP option information included in the second TCP option information notifying message is used when performing communication from the first terminal to the second.

8. The communication system according to claim 1, wherein communication between the first terminal and the server is performed via a first TCP connection termination node, and
wherein communication between the second terminal and the server is performed via a second TCP connection termination node.

9. A server that relays packet data transmitted and received between a first terminal and a second terminal, the server comprising:
a connection establishment message processing unit that receives a first SYN message from the first terminal for establishing a first TCP connection, and transmits by a non-transitory processor a first SYN ACK message, that is a response message to the first SYN message transmitted from the first terminal for establishing a TCP connection, upon receiving the first SYN message from the first terminal; and
an option information notifying unit that transmits by the non-transitory processor a first TCP option information notifying message that includes first TCP option information included in the first SYN message from the first terminal and first communication destination information which indicates the second terminal as a destination of communication,
wherein the option information notifying unit transmits the first TCP option information notifying message to the first terminal so that the first terminal recognizes the second terminal as the destination of communication and notifies the second terminal of the first TCP option information; and
an address-option correspondence management table storing unit that stores by the non-transitory processor an address-option correspondence management table in which a TCP connection waiting address, which includes an IP address and a port number, and second TCP option information are registered in association with each other,
wherein the connection establishment message processing unit receives a second SYN message from the second terminal for establishing a second TCP connection, and transmits a second SYN ACK message which is a response message to the second SYN message transmitted from the second terminal, including the second TCP option information, which is associated with the TCP connection waiting address including the IP address and the port number used to receive the first SYN message from the first terminal.

10. The server according to claim 9, wherein the option information notifying unit further transmits a second TCP option information notifying message that includes third TCP option information included in a second SYN message from the second terminal and second communication destination information which indicates the first terminal as a destination of communication,
wherein the option information notifying unit transmits the second TCP option information notifying message to the second terminal so that the second terminal recognizes the first terminal as the destination of communication and notifies the first terminal of the third TCP option information.

11. A terminal that transmits and receives packet data with another terminal via a server,
wherein the terminal transmits by a non-transitory processor a SYN message to the server and receives a TCP option information notifying message that includes first TCP option information included in the SYN message and communication destination information which indicate the other terminal as a destination of communication,
wherein the terminal recognizes by the non-transitory processor the other terminal as the destination of communication and notifies the other terminal of the first TCP option information included in the TCP option information notifying message, upon receiving the TCP option information notifying message from the server; and
wherein a TCP connection waiting address, which includes an IP address and a port number, and second TCP option information, are registered in association with each other, such that a SYN ACK message which is a response message to a SYN message transmitted from the terminal, is transmitted that includes the second TCP option information associated with the TCP connection waiting address including the IP address and the port number used to receive the SYN message from the terminal, wherein the terminal transmits SYN message to the server for establishing a first TCP connection and the other terminal transmits a second SYN message to the server for establishing a second TCP connection which enables the terminal to transmit and receive packet data with the other terminal via the server.

12. The terminal according to claim 11,
wherein the terminal notifies the other terminal of the TCP option information via the server.

13. The terminal according to claim 11, wherein the terminal directly notifies the other terminal of the TCP option information.

14. The terminal according to claim 11,
wherein the terminal notifies the other terminal of the TCP option information through an email message.

15. The terminal according to claim 11,
wherein the terminal notifies the other terminal of the TCP option information through a Session Initiation Protocol (SIP).

16. The terminal according to claim 11,
wherein the terminal communicates with the server via a TCP connection terminal node.

17. A packet data transferring method, with which a communication system, having a plurality of terminals and a server that relays packet data transmitted and received between a first terminal and a second terminal among the plurality of terminals, transmits packet data, the method comprising:

a connection establishment message processing operation, performed in a non-transitory processor, comprising receiving a first SYN message from the first e for establishing a first TCP connection, and transmitting, from the server to the first terminal, a first SYN ACK message that is a response message to a first SYN message transmitted from the first terminal for establishing a TCP connection, upon receiving the first SYN message from the first terminal;

an option information notifying operation, performed in the non-transitory processor, comprising transmitting, from the server to the first terminal, a first TCP option information notifying message that includes first TCP option information included in the first SYN message from the first terminal and first communication destination information which indicates the second terminal as a destination of communication;

a first recognizing operation comprising recognizing, by the first terminal, the second terminal as the destination of communication based on the first communication destination information included in the first TCP option information notifying message transmitted by the option information notifying operation; and a first notifying operation comprising notifying, by the first terminal, the second terminal of the first TCP option information included in the first TCP option information notifying message, upon receiving the first TCP option information notifying message transmitted by the option information notifying operation; and an address-option correspondence management table storing operation, performed in the non-transitory processor, comprising storing, in the server, an address-option correspondence management table in which a TCP connection waiting address, which includes an IP address and a port number, and a second TCP option information are registered in association with each other, wherein the connection establishment message processing operation receives a second SYN message from the second terminal for establishing a second TCP connection, and transmits a second SYN ACK message which is a response message to a second SYN message transmitted from the second terminal, including the second TCP option information, which is associated with the TCP connection waiting address including the IP address and the port number used to receive the first SYN message from the first terminal.

18. The packet data transferring method according to claim 17, wherein the first notifying operation notifies the second terminal of the first TCP option information via the server.

19. The packet data transferring method according to claim 17, wherein the first notifying operation directly notifies the second terminal of the first TCP option information.

20. The packet data transferring method according to claim 17, wherein the first TCP option information included in the first TCP option information notifying message is used when performing the communication from the second terminal to the first terminal.

21. The packet data transferring method according to claim 17, further comprising:

a second SYN message transmitting operation comprising transmitting, from the second terminal to the server, a second SYN message by using the IP address and the port number included in the TCP connection waiting address, the TCP connection waiting address being associated with the first TCP option information.

22. The packet data transferring method according to claim 17, wherein the option information notifying operation further transmits a second TCP option information notifying message that includes third TCP option information included in a second SYN message from the second terminal and second communication destination information which indicates the first terminal as a destination of communication, and wherein the method further comprises:

a second recognizing operation comprising recognizing, by the second terminal, the first terminal as the destination of communication based on the second communication destination information included in second TCP option information notifying message transmitted by the option information notifying operation; and a second notifying operation comprising notifying, by the second terminal, the first terminal of the third TCP option information included in the second TCP option information notifying message, upon receiving the second TCP option information notifying message transmitted by the option information notifying operation.

23. The packet data transferring method according to claim 22, wherein the third TCP option information included in the second TCP option information notifying message is used when performing communication from the first terminal to the second terminal.

24. The packet data transferring method according to claim 17,
- wherein communication between the first terminal and the server is performed via a first TCP connection termination node, and
- wherein communication between the second terminal and the server is performed via a second TCP connection termination node.

25. A non-transitory computer readable medium having embodied thereon a program, which when executed by a computer serving as a server that relays packet data transmitted and received between a first terminal and a second terminal, the program causes the computer to execute a method comprising:
- transmitting a first SYN ACK message, that is a response message to a first SYN message transmitted from the first terminal for establishing a TCP connection, upon receiving the first SYN message from the first terminal; and
- transmitting a first TCP option information notifying message that includes first TCP option information included in the first SYN message from the first terminal and first communication destination information which indicates the second terminal as a destination of communication,
- wherein the first TCP option information notifying message is transmitted to the first terminal so as to enable the first terminal to recognize the second terminal as the destination of communication, and the first terminal notifies the second terminal of the first TCP option information; and
- storing an address-option correspondence management table in which a TCP connection waiting address, which includes an IP address and a port number, and second TCP option information are registered in association with each other; and
- transmitting a second SYN ACK message which is a response message to a second SYN message transmitted from the second terminal, including the second TCP option information, which is associated with the TCP connection waiting address including the IP address and the port number used to receive the first SYN message from the first terminal.

26. The non-transitory computer readable medium according to claim 25, wherein the method further comprises:
- transmitting a second TCP option information notifying message that includes third TCP option information included in a second SYN message from the second terminal and second communication destination information which indicates the first terminal as a destination of communication,
- wherein the second TCP option information notifying message is transmitted to the second terminal so that the second terminal recognizes the first terminal as the destination of communication and notifies the first terminal of the third TCP option information.

27. A non-transitory computer readable medium having embodied thereon a program, which when executed by a computer serving as a terminal that transmits and receives packet data with another terminal via a server, the program causes the computer to execute a method comprising:
- transmitting a SYN message to the server;
- receiving a TCP option information notifying message that includes first TCP option information included in the SYN message and communication destination information which indicates the other terminal as a destination of communication;
- recognizing the other terminal as the destination of communication based on the communication destination information included in the received TCP option information notifying message; and
- notifying the other terminal of the first TCP option information included in the TCP option information notifying message, upon receiving the TCP option information notifying message,
- wherein a TCP connection waiting address, which includes an IP address and a port number, and second TCP option information, are registered in association with each other, such that a SYN ACK message which is a response message to a SYN message transmitted from the terminal, is transmitted that includes the second TCP option information associated with the TCP connection waiting address including the IP address and the port number used to receive the SYN message from the terminal,
- wherein the terminal transmits the SYN message to the server for establishing a first TCP connection and the other terminal transmits a second SYN message to the server for establishing a second TCP connection which enables the terminal to transmit and receive packet data with the other terminal via the server.

28. The non-transitory computer readable medium according to claim 27,
- wherein the other terminal of the TCP option information is notified via the server.

29. The non-transitory computer readable medium according to claim 27,
- wherein the other terminal is notified of the TCP option information directly by the terminal.

* * * * *

UNITED STATES PATENT AND TRADEMARK OFFICE
CERTIFICATE OF CORRECTION

PATENT NO. : 9,043,477 B2
APPLICATION NO. : 12/348521
DATED : May 26, 2015
INVENTOR(S) : Yuichi Ishikawa et al.

Page 1 of 1

It is certified that error appears in the above-identified patent and that said Letters Patent is hereby corrected as shown below:

In the Claims

Column 17, Line 5: In Claim 11, after "transmits" insert -- the --

Column 17, Line 36: In Claim 17, before "for" delete "e" and insert -- terminal --

Signed and Sealed this
First Day of December, 2015

Michelle K. Lee
*Director of the United States Patent and Trademark Office*